United States Patent [19]

Nagarkatti et al.

[11] Patent Number: 4,631,510
[45] Date of Patent: Dec. 23, 1986

[54] HARMONICALLY GRADED AIRGAP RELUCTANCE-TYPE ROTATING ELECTRIC RESOLVER

[75] Inventors: Ashok Nagarkatti; Robert E. Lordo, both of Charlotte, N.C.; Burkhart Kind, Pittsburgh, Pa.

[73] Assignee: Powerton, division of Contraves Goerz Corporation, Charlotte, N.C.

[21] Appl. No.: 771,815

[22] Filed: Sep. 3, 1985

[51] Int. Cl.$^4$ .................... H01F 21/06; H02K 19/24
[52] U.S. Cl. ..................................... 336/135; 310/168
[58] Field of Search ............... 336/130, 132, 134, 135; 310/111, 168

[56] References Cited

U.S. PATENT DOCUMENTS

| | | | |
|---|---|---|---|
| 2,494,493 | 1/1950 | Schaevitz | 336/135 X |
| 3,041,486 | 6/1962 | Moffitt | 336/135 X |
| 3,281,655 | 10/1966 | Blasingame | 336/135 X |
| 3,641,467 | 2/1972 | Ringland et al. | 336/135 X |
| 3,851,199 | 11/1974 | Apsit et al. | 310/168 |
| 4,255,682 | 3/1981 | Toida et al. | 310/168 |

OTHER PUBLICATIONS

The Bell System Technical Journal—"Design, Performance and Application of the Vernier Resolver"-G. Kronacher, Nov. 1957, pp. 1487-1500.

Primary Examiner—Arthur T. Grimley
Assistant Examiner—C. Romano
Attorney, Agent, or Firm—W. Thad Adams, III

[57] ABSTRACT

This invention relates to a harmonically graded airgap reluctance-type rotating electric resolver. The magnetic permeance of the airgap is made to vary sinusoidally. Therefore, only the fundamental wave exists, free of higher harmonics. The invention has application in numerous fields, including commutation of brushless motors and to precisely position machinery tools relative to work pieces in numerically controlled machines.

15 Claims, 12 Drawing Figures

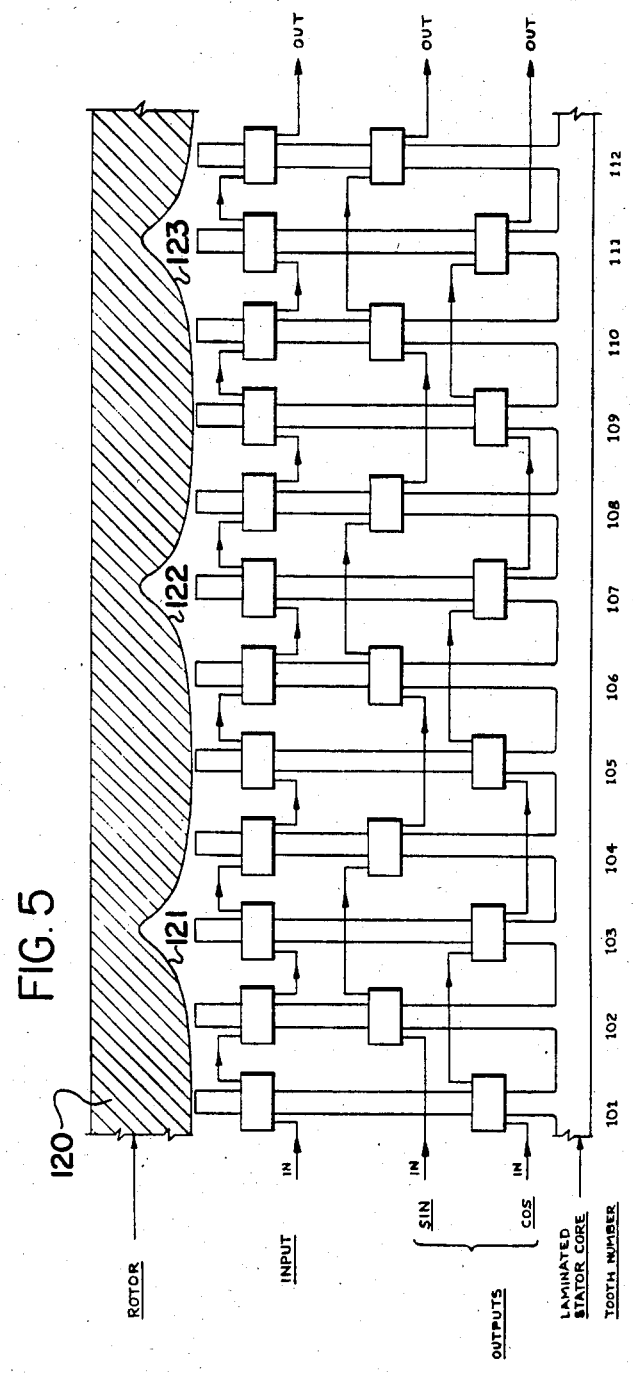

START  FINISH

START  FINISH

START  FINISH

HARMONICALLY GRADED AIRGAP RELUCTANCE-TYPE ROTATING ELECTRIC RESOLVER

TECHNICAL FIELD AND BACKGROUND OF THE INVENTION

A rotating electric resolver is an electromagnetic device which is used to accurately indicate the angular position of the rotor with reference to some fixed frame of reference. A typical embodiment of such a resolver comprises an input winding and a pair of output windings. The output windings are typically identical to each other but are wound with a 90 degree phase displacement relative to each other. Consequently, their electrical outputs are similar except for 90 degree phase displacement in time between them. Therefore, if one of the output windows produces an output signal that is proportional to the sine of the angle that the rotor makes with a reference axis at some instant of time, then the other output winding will produce an output signal that will be proportional to the cosine of the same angle. The following formula represents this event: $\sin(\theta+90°)=\cos\theta$.

If one knows the values for $\sin\theta$ and $\cos\theta$ at any instant, then one can compute the value of $\theta$, for this value will be unique. Knowing $\theta$ is equivalent to knowing the rotor position at any predetermined instant of time.

There are two basic types of conventional resolvers. One type has sliprings and brushes. The input winding is located in punched laminations housed in the stator. The output windings are located in laminations mounted on the rotor shaft. The electrical outputs of the output windings are led to the sliprings, and collected by stationary brushes that ride on the rotating sliprings. In the other type of conventional resolver, the input winding is located in the rotor, while the output windings are located in the stator. An additional set of magnetically coupled coils on both the stator and the rotor is used to convey the input voltage to the rotating input by inductive or transformer action in these coils.

As is apparent, any device that has sliding contacts and/or rotating windings is more expensive to manufacture and is inherently less reliable than a device which has only stationary windings.

In an attempt to eliminate the above-mentioned drawbacks of conventional resolvers, alternative designs have been heretofore produced in which the input as well as the output windings are all located in the stator laminations in an electrically insulated configuration from each other. The rotor itself carries no windings and merely consists of slots and teeth that do not conform to any mathematically defined shape. As exemplified in the prior art, the function of the slots and teeth is only to abruptly vary the airgap between pairs of rotor teeth, so that a voltage is generated in the output windings as the rotor teeth whip past them. This is caused by a rapid change of reluctance in accordance with Faraday's Law of Induced Voltages. However, in generating an output signal in this manner, the output waveform contains a high harmonic content which introduces electrical noise which results in serious inaccuracies. In fact, this type of resolver is only a scaled-down version of the well-known inductor alternator that is used for producing high frequency currents for eddy current steel melting furnaces.

A more sophisticated version of this principle was first disclosed by Kronacher in 1957. In the Kronacher apparatus, the input and output windings are all located in the stator. The rotor has slots that again do not conform to any mathematically defined shape. Waveform improvement was effected by introducing the concept of varying the number of turns in each coil of one output winding according to a cosine formula and varying the number of turns in the coils of the other output winding according to a sine formula. This resulted in all of the output coils being different from each other not only in the number of turns but also in their wire gauge sizes. The manufacture of this device is extremely complicated, whether done by manual or automatic means. Furthermore, the output waveform was not free of harmonics since the rotor slotting was abrupt, as in the earlier prior art devices. Insofar as is known, Kronacher's design did not lead to a commercially viable product. The next development in the area is exemplified by the Ringland U.S. Pat. No. 3,641,467. Ringland attempts to avoid the inherent deficiencies in the Kronacher apparatus by expressing a desire to vary the airgap permeance sinusoidally. As stated in Ringland, "Sinusoidal variation of the permeances... will result if rotor 27 is contoured as shown to have sinusoidal variation of airgap spacings to teeth 1-6..." (Column 3, lines 35-39). Unfortunately, this statement is flatly wrong both in theory and in practice. According to electromagnetic theory, the stated objective in Ringland '467 is achieved not by varying the airgap sinusoidally, but by a sinusoidal variation of the reciprocal of the airgap spacing. Therefore, any design made in accordance with the teachings of Ringland '467 functions with a pronounced harmonic content in the output waveform. This was apparently recognized, by inference, in the Ringland Patent, since the crests of the rotor lobes shown in FIGS. 7 and 11 of the '467 Patent have been flattened somewhat in comparison to their shape as defined mathematically and mapped in FIG. 9. The fundamental flaw in the '467 Patent is, in fact, a fatal one and, insofar as is known, devices of the general type described in the '467 Patent have not gained acceptance in the marketplace.

SUMMARY OF THE INVENTION

Therefore, it is an object of the invention to provide a reluctance-type resolver for an electric machine which achieves a high degree of accuracy.

It is another object of the present invention to provide a reluctance-type resolver for an electric machine which is relatively simple and easy to manufacture.

It is a further object of the present invention to provide a reluctance-type resolver for an electric machine which achieves a sinusoidal variation in the magnetic permeance of the airgap between the rotor and stator in such a way that the sine wave exists free of higher harmonics, thereby achieving a much greater degree of accuracy.

These and other objects of the present invention are achieved in the preferred embodiments disclosed below by providing a reluctance-type resolver for an electric machine which comprises a toothed laminated ferromagnetic stator having input and output windings thereon, and a rotor with one or more lobes positioned within the stator. The rotor is of either solid or laminated ferromagnetic material and defines a periphery profiled to produce during rotation a smoothly varying airgap according to a formula wherein the inverse of the radial airgap at any predetermined point on the rotor is proportional to a constant plus the sine of the product of the number of lobes on the rotor and the angle between the predetermined point on the rotor and a reference point on the stator. According to this construction, the magnetic permeance of the airgap varies sinusoidally.

According to the preferred embodiment of the invention, the relationship between the stator teeth and the rotor lobes is stated by the formula P=4N, where P is the number of teeth on the stator and N is the number of lobes on the rotor. According to this embodiment of the present invention, the stator includes a single-phase input winding and a pair of output windings.

According to a more general embodiment according to the present invention, a reluctance-type resolver is provided which includes a single-phase input winding and a $M_2$-phase output having $M_2$ output windings where $M_2$ is any integer, including unity. The relationship between the stator and the rotor is stated in the formula $P=2M_2N$, where P is the number of teeth on the stator and N is the number of lobes on the rotor.

According to an even more general embodiment of the present invention, a reluctance-type resolver is provided which includes an $M_1$-phase input where $M_1$ is any integer including unity, and $M_2$-phase output where $M_2$ is any integer including unity, wherein the relationship between the stator and the rotor is stated by the formula $P=2M_1M_2N$, where P is the number of teeth on said stator and N is the number of lobes on said rotor.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 5 is a planar representation of a rotor and stator of the preferred embodiment of the invention, as shown in FIG. 3;

DESCRIPTION OF THE PREFERRED EMBODIMENT

Figure 1:
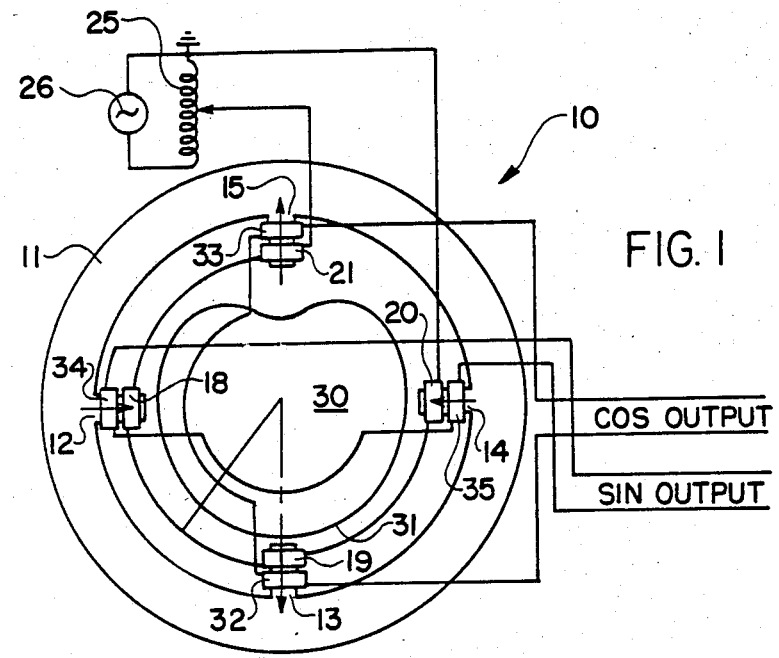
FIG. 1 is a schematic diagram of a single-lobe rotor reluctance-type resolver according to one embodiment of the invention.

Before referring in detail to the drawings, further explanation of the theory of design and construction of a resolver according to the present invention is set forth here. In the generic invention according to this application, the input and the output windings are all located on a common laminated stator. The rotor is deliberately profiled to produce a smoothly varying airgap. The pattern of variation is not arbitrary but has been designed such that the inverse of the radial airgap at any point is proportional to a constant plus the sine of the product of the number of rotor lobes and the angle between that point on the rotor and the reference axis. Thus the magnetic permeance of the airgap is made to vary sinusoidally and only the fundamentally (pure sine) wave exists free of the higher harmonics. Thus the rotor has the appearance of a smooth N-lobed solid where N could be 1,2,3 or any integer. If N=2, the rotor has a dumbbell shape. Moreover, by making the number of stator teeth P a certain theoretically established multiple of the number of rotor lobes N, it has become possible to make all of the output coils identical in the number of turns per coil and the wire gauge size. Each output winding embraces only half the number of stator slots instead of all of the slots as in Kronacher's general principle, referenced above.

A detailed mathematical analysis has established that the constant multiple referred to above must have the value 4/J, where J could be any convenient odd integer. A convenient odd value for J is unity (J=1). Then the multiple has the value 4, and we have the relationship: P=4N. This relationship is basic to the success of the resolver described in this application. A considerable number of tests with prototypes conforming to the above-mentioned principles have attested to its validity. The final result is a new type resolver that is the least expensive to manufacture and has the highest reliability owing to be absence of rotating windings, sliprings and brushes, but has at the same time an output waveform having the least harmonic (noise) content.

Adopting the relationship between the number of stator teeth P and rotor lobes N as stated above, the input comprises a single-phase winding of P coils with all coils having the same number of turns. Looking radially outward at the surfaces of the teeth facing the airgap, the turns of successive coils are wound alternately clockwise (hereafter abbreviated "CW") and counter-clockwise (abbreviated "CCW") around successive teeth, such as for example CW on tooth no. 1, CCW on tooth no. 2, CW on tooth no. 3, and so on until all the P coils have been wound. The pair of sine and cosine modulated output windings respectively referred to as "sine winding" and "cosine winding", constitutes a 2-phase output. Each of these output windings has P/2 coils having the same number of turns each. The turns of successive coils of each output winding are wound alternately CW and CCW around alternate stator teeth. For example, the turns of the coils of the "sine winding" are wound CW on tooth no. 1, CCW on tooth no. 3, CW on tooth no. 5, and so on until all of its P/2 coils have been wound, while the turns of the coils of the "cosine winding" are wound on the remaining teeth that are not wound with the "sine winding" coils in a manner similar to the latter, that is in the present example, CW on tooth no. 2, CCW on tooth no. 4, CW on tooth no. 6, and so on until all P/2 coils of the "cosine winding" have been wound.

The foregoing description is that of a basic and relatively simple resolver comprising a single-phase input winding and 2-phase output winding as illustrated schematically in FIG. 1 for the case N=1 and P=4.

Figure 2:
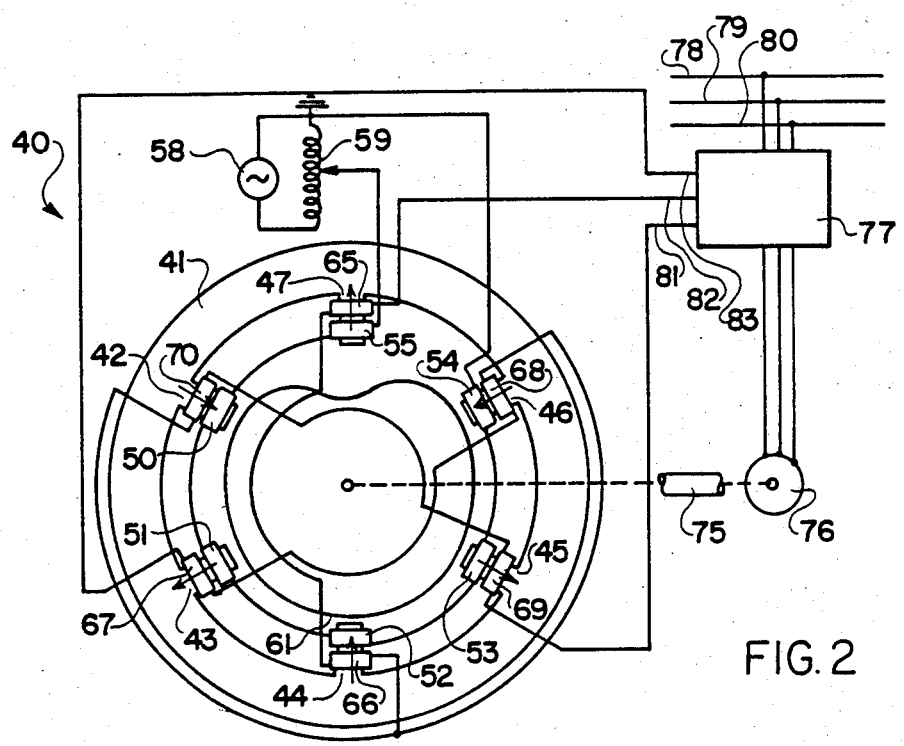
FIG. 2 is a schematic diagram of a three-lobe rotor reluctance-type resolver according to another embodiment of the present invention.

These principles can be generalized to the case of an $M_2$-phase output having $M_2$ output windings, where $M_2$ is any integer including unity, while the input is still a single-phase winding as in the foregoing description. Therefore for any number of stator teeth P, which is assumed always even, the input winding coils are wound exactly as detailed earlier. The $M_2$ output phase windings may or may not be balanced as regards the number of turns per phase. For balanced outputs the case of $M_2$ balanced output phases is considered where each phase has $P/M_2$ coils and all coils have the same number of turns (which is not necessarily the same in value as in the input winding coils). The turns of the coils of the first phase winding of the output are wound alternately CW and CCW on stator teeth separated by a pitch of $M_2$ teeth, for example as shown in the following scheme, which is illustrated in FIG. 2 for the case $M_2=3$, N=1 and P=6:

| Tooth no.: | 1 | $1 + M_2$ | $1 + 2M_2$ | $1 + 3M_2$ | ... |
|---|---|---|---|---|---|
| Direction of wound turns: | CW | CCW | CW | CCW | ... |

The turns of the coils of a second phase winding of the output are wound in a manner similar to that of the first phase but are displaced with respect to the first phase by 1 tooth, as shown for example by the following scheme:

| Tooth no.: | 2 | $2 + M_2$ | $2 + 2M_2$ | $2 + 3M_2$ | ... |
|---|---|---|---|---|---|
| Direction of wound turns: | CW | CCW | CW | CCW | ... |

In the same manner a third, fourth, ..., or $M_2$-th output phase winding is wound with the number 1 in the scheme stated for the first output phase replaced in turn by 3, 4, ..., and $M_2$ respectively.

A detailed mathematical analysis for the present case of a single-phase input shows that provided P and N are related by the formula: $P=(2M_2/J)\cdot N$, where the symbols are as defined earlier, balanced outputs will be normally obtained from all of the $M_2$ output phases with a relative phase displacement of angle $\phi$ equal to $180/M_2$ electrical degrees between successive output phases. The first, second, third, fourth, ..., and $M_2$-th phases of the output will have their output voltage waveforms modulated by the factors: $\sin(\theta)$, $\sin(\theta+\phi)$, $\sin(\theta+2\phi)$, $\sin(\theta+3\phi)$, ..., and $\sin(\theta+(M_2-1)\phi)$ respectively. FIG. 2 shows the schematic for the case N=1, $M_2=3$, and P=6.

The 2-phase output system considered in the beginning is therefore a special case of this more generalized case with $M_2$ having the value 2. A further generalization is possible in which not only the output but the input as well is multi-phase. Denote the number of input phases by $M_1$, where $M_1$ is any integer including unity.

These input phases may or may not be balanced as regards the number of turns per phase. For input voltages that are balanced as to both magnitude and phase difference between successive phases, consider the case of $M_1$ balanced input phase windings where each phase winding has $P/M_1$ coils, all coils having the same number of turns. Clearly P has to be a multiple of $M_1$. Further P is even by the assumption stated earlier. The total number of coils in all of the input windings is the same as the number of stator teeth, namely P. These P teeth are equally and evenly assigned to the $M_1$ input phases, for example tooth no. 1 to phase no. 1, tooth no. 2 to phase no. 2, ..., and tooth no. $M_1$ to phase no. $M_1$; continuing in this manner, tooth no. $(1+M_1)$ to phase no. 1, tooth no. $(2+M_1)$ to phase no. 2, ..., and tooth no. $(2M_1)$ to phase $M_1$; and so on in a repetitive and cyclic manner until all the P teeth have been assigned.

The first phase of the input is wound generally as described for the single-phase input case. That is, the turns of the coils of phase no. 1 are wound alternately CW and CCW on successive teeth that have been allotted to phase no. 1 in the manner stated in the earlier paragraph, for example CW on tooth no. 1, CCW on tooth no. $(1+M_1)$, CW on tooth no. $(1+2M_1)$, and so on until all coils of phase no. 1 have been wound.

A second, third, ..., or $M_1$-th input phase winding is wound in the same manner as the first input phase winding with the number 1 in the scheme detailed in the previous paragraph for phase no. 1 replaced in turn by the numbers 2, 3, ..., and $M_1$ respectively.

The $M_2$ output phase windings are wound as detailed in the schemes for the output phase windings presented for the single-phase input case. The latter is therefore a special case of the generalized one just detailed with $M_1$ having the value unity.

If the input voltages of the input phases are all balanced, the $M_2$ output output voltages will also be balanced, provided the input and output phases have been wound as described in the foregoing paragraphs and provided P and N are related by the formula:

$$P=(2M_1\cdot M_2/J)\cdot N,$$

where all the symbols have the same meanings as assigned to them earlier. This follows from a generalization of the previously stated formula for the case of single-phase input ($M_1=1$) and $M_2$-phase output.

In conclusion, the new design principles are as follows:

(a) A harmonically graded airgap given by equation (1) below, resulting from an unwound solid or laminated rotor that has N smooth profiled lobes.

$$\text{Air Gap at angle } \theta = A/(B+\sin(N\theta)), \tag{1}$$

where A and B are constants, and N is the number of rotor lobes (specified by the user). Typical values for N are 1,2,3, or 4, but N could be any integer. For assumed values of A and B, and with N=3, equation (1) yields a rotor contour as shown in the FIG. 8.

(b) A stator tooth number P that is related to the number of rotor lobes N by equation (2) below.

$$P=(2M_1\cdot M_2/J)\cdot N \tag{2}$$

where J is an odd integer (usually, if not always, unity), and $M_1$ and $M_2$ are the numbers of stator and rotor phases respectively, all assumed balanced for the application of this equation.

It is believed that these design principles are unique to the resolver disclosed in this application, and have not been used in the design of rotating electric machines in general and resolvers in particular. In this design an "inside-out" construction is also easily possible, in which the unwound N-lobed rotor is on the outside, while the primary and secondary windings are all located in a stationary inner laminated core, with the airgap graded in accordance with Formula (1). The closest any manufacturer has come to these principles is in the case of U.S. Pat. No. 3,641,467 of Ringland et al (assigned to Allis-Chalmers Manufacturing Co., Milwaukee, WI), referred to above, wherein the airgap is made to vary sinusoidally, in accordance with an equation of the type stated in equation (3) below, in the erroneous belief that this would also make the airgap permeance vary sinusoidally.

$$\text{Air Gap at angle } \theta = A(B + \sin(N\theta)), \quad (3)$$

where A and B are constants, and N is the number of rotor lobes.

Referring now specifically to the drawings, a single-lobe rotor reluctance-type resolver according to the present invention is shown in FIG. 1 and broadly designated at reference numeral 10. Resolver 10 is constructed of a stator 11 formed of a suitable ferromagnetic material, preferably in the form of stacked laminations. Stator 11 includes four radially inwardly extending teeth 12-15, inclusive. The input winding comprises four serially connected coils 18-21 wound onto teeth 12-15, respectively. Coils of input windings 18-21 are wound in the same direction on diametrically opposed teeth so that teeth 12 and 14 have a magnetic flux flow opposite that of teeth 13 and 15. The input winding is excited with an AC signal, the magnitude of which can be varied by means of a transformer 25 connected across a suitable AC source 26.

A rotor 30 is positioned for rotation within stator 11. Rotor 30 has a single lobe. The peripheral shape of rotor 30 is determined mathematically in accordance with the formula (1) above. Magnetic flux generated by input windings 18-21 flow across the airgaps into rotor 30. A first output winding, represented by windings 32 and 33 on diametrically opposed teeth 13 and 15, respectively, are wound in opposite directions so that magnetic flux flow is in opposite directions through coils 32 and 33. A second output winding, represented by windings 34 and 35 are wound onto diametrically opposed teeth 12 and 14 in opposite directions.

As rotor 30 rotates, magnetic flux paths through teeth 18-21 and across the airgaps into rotor 30 vary sinusoidally. The permeance of the flux path through each tooth 18-21 is a function of the position of rotor 30 and is at a maximum when lobe 31 is opposite a given tooth. The demodulated waveforms of voltages induced in output windings 32, 33 and 34, 35, respectively, are representative of the cosine and sine, respectively, of any given angle between the stator 11 and the lobe 31 on rotor 30. The output voltages may be transmitted electrically to control a synchronized motor or perform any other function wherein it is desired to compute rectangular coordinates.

Referring now to FIG. 2, a three-lobe rotor reluctance-type resolver according to the present invention is shown and generally designated at reference numeral 40. Resolver 40 includes a stator 41 constructed of stacked ferromagnetic laminations and provided with six radially inwardly extending teeth 42-47, inclusive, each tooth being spaced 60 degrees from its neighbor. The input winding includes six serially connected coils 50-55 wound to encircle teeth 42-47, respectively. The windings are wound in such a direction that the magnetic flux is generated in opposite directions in adjacent teeth. The input winding may be excited from an AC source 58 and controlled through a transformer 59.

A rotor 60, having a single lobe 61 is mounted for rotation within stator 41 and has a varying airgap spacing from teeth 42-47, as described above. Again, the variation in magnetic permeance of the airgap varies sinusoidally as rotor 60 rotates, in accordance with formula (1) above. Resolver 40 has a pair of diametrically opposed teeth in each of the three output phases. A first output has a coil 65 on tooth 47 connected in series with a coil 66 on tooth 44. Windings 65 and 66 are in opposite directions. A second output winding includes a coil 67 on tooth 43 in series with an oppositely wound coil 68 on tooth 46.

A third output has a coil 69 in series with an oppositely wound coil 70 on tooth 42. Rotor 60 may be connected by means of a shaft 75 to a motor 76 controlled by a suitable motor controller 77 which regulates the delivery of electrical current from buses 78, 79 and 80 to motor 76 as a function of output signals 81, 82, 83, from resolver 40.

Figures 3, 4:
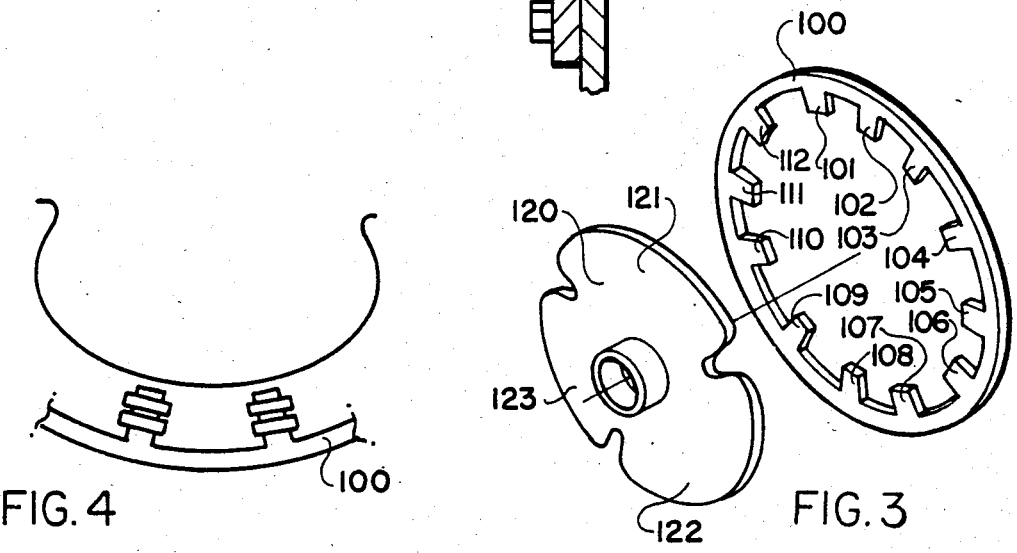
FIG. 3 is a perspective view of the stator and rotor according to a preferred embodiment of the invention.
FIG. 4 is a fragmentary view of a rotor and stator of the type shown in FIG. 3.

FIG. 3 illustrates, schematically, yet another variation of the possible combinations of rotor and stator. Stator 100 is provided with twelve teeth 101-112, respectively. A rotor 120 is mounted for rotation within stator 100 and has three lobes 121-123, respectively, the shape of which is calculated and designed according to Formula (1) above.

In accordance with Formula (2) above, the number of teeth on the stator, in this case twelve, is seen to be four times the number of lobes on rotor 120 according to this particular instance, in which $M_1=1$, $M_2=2$ and $N=3$, with $J=1$.

FIG. 4 illustrates, in the example shown in FIG. 3, two of the teeth at some instant of time in relation to one of the rotor lobes.

FIG. 5 is a schematic planar view of stator 110 and rotor 120, as shown in FIG. 3. The length of teeth 101-112 have been exaggerated so that the position and wiring of the coils can more easily be seen.

Figure 6:
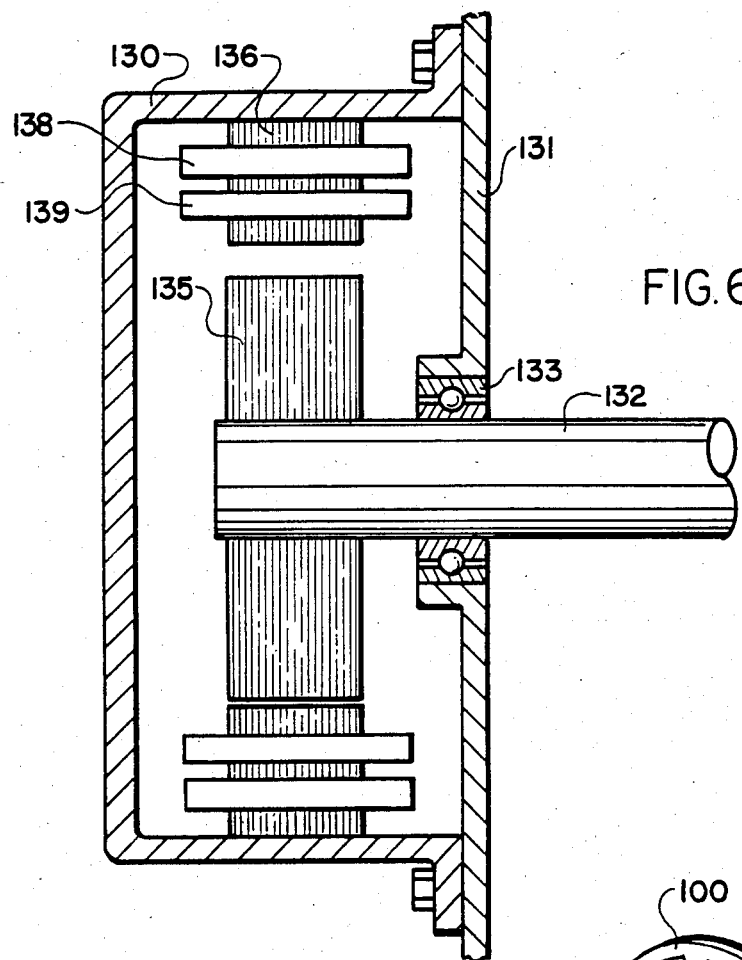
FIG. 6 is a vertical cross-sectional view taken through a single-lobe laminated rotor reluctance-type resolver according to one embodiment of the invention, as is shown in FIG. 1.

A physical embodiment of any one of the devices disclosed above may be contained in a very compact case, as for example a case 130 having an end closure plate 131 as illustrated in FIG. 6. A shaft 132 is mounted through end closure plate 131 by means of conventional rolling bearings 133. A rotor 135 according to a desired embodiment of the invention is mounted on shaft 132 and is surrounded by stator 136 having windings 138 and 139 thereon in the same manner as, for example, FIGS. 1 or 2. Of course, depending upon the particular application, shaft 132 may be connected to the rotor of a controlled motor or to some other prime mover.

Figure 7:
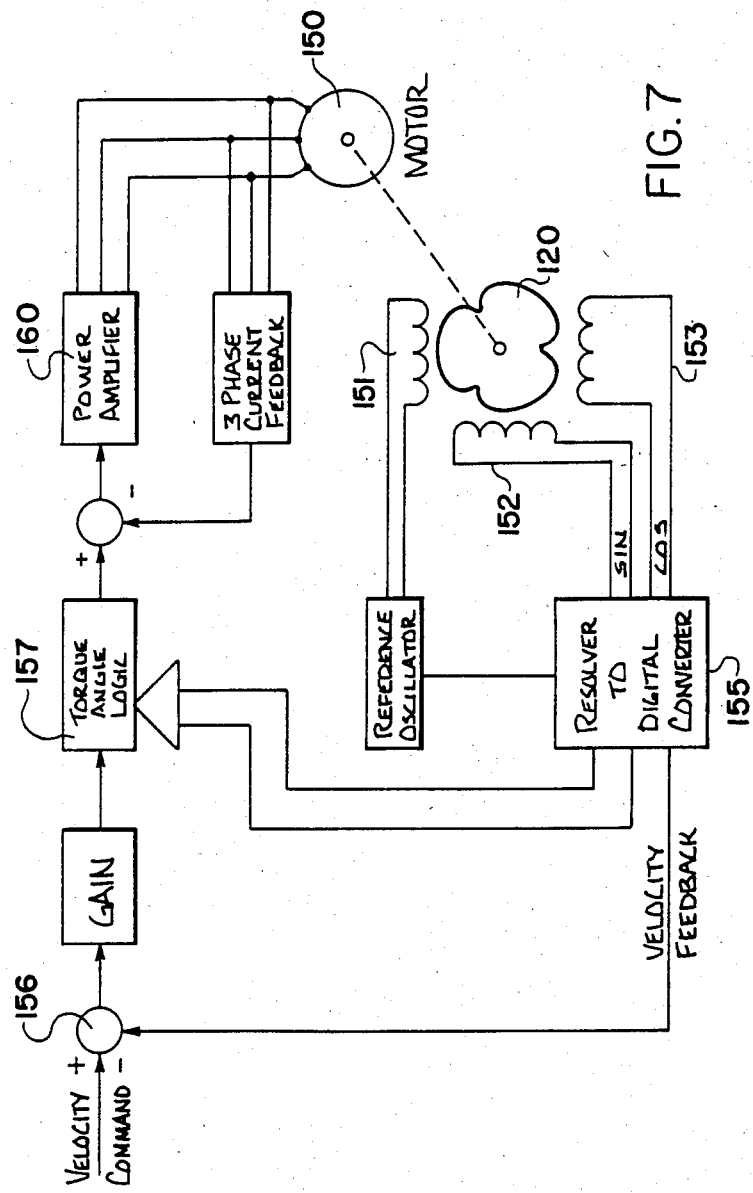
FIG. 7 is a schematic diagram of an adjustable speed synchronous motor incorporating a three-lobe rotor reluctance-type resolver according to the present invention.

FIG. 7 illustrates a use of the resolver according to the present invention to regulate the torque and speed of a motor 150. Rotor 120 is mounted for rotation within a stator (not shown) which has an input winding 151, and two output windings, a sine output winding 152 and a cosine output winding 153. Current input through input winding 151 is by way of a reference oscillator. Sine and cosine information from output windings 152 and 153, respectively, is converted to digital information in a resolver to digital converter 155. This information, in digital form, is fed to a velocity command circuit 156 and also to a torque angle logic circuit 157. This information is integrated with three-phase current feedback from motor 150 and fed to a power amplifier 160, the output of which regulates the torque and the speed of motor 150.

Figure 8:
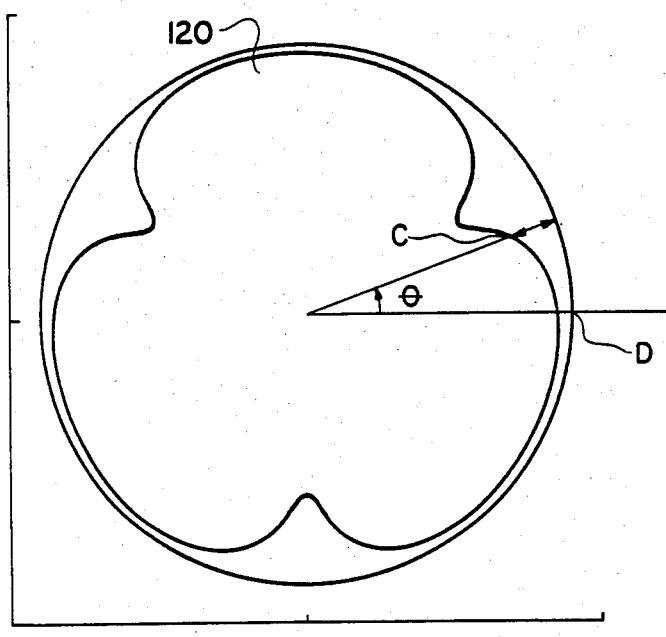
FIG. 8 is a schematic plan view of a three-lobe rotor according to the present invention.

FIG. 8 constitutes an accurate representation of the profile of rotor 120, with the three lobes 121, 122, 123 formed in precise according with Formula (1) above. In accordance with this formula, the inverse of the radial airgap at any predetermined point on the rotor, as for example point C in FIG. 8, is proportional to a constant plus the sine of the product of the number of lobes on rotor 120 and the angle $\theta$ between the predetermined point C on rotor 120 and a reference point D on the stator. Accordingly, the magnetic permeance of the airgap varies in a pure sinusoidal fashion.

Figure 9:
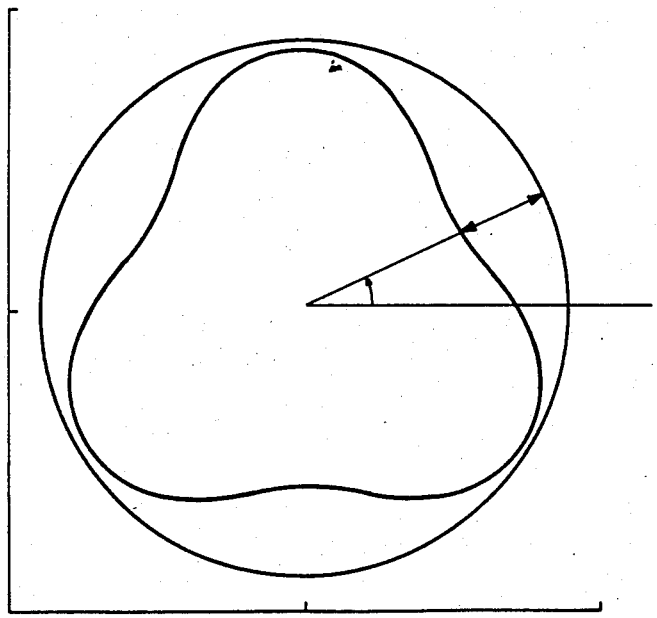
FIG. 9 is a schematic plan view of a three-lobe rotor calculated and mapped according to the invention disclosed in U.S. Pat. No. 3,641,467.

Referring now to FIG. 9, the rotor shown is designed in accordance with Formula (3), above. For FIG. 8, the factor B+sin (N$\theta$) occurs in the denominator, while for U.S. Pat. No. 3,641,467 such a factor would figure in the numerator of the airgap formula. With the values of A and B in Formula (3) chosen to give the same minimum and maximum airgaps as in FIG. 8, and with N=3, Formula (3) results in a rotor contour as depicted in FIG. 9. As is apparent, this differs considerably from that shown in FIG. 8. The latter and not FIG. 9 constitutes the shape which will give a true sinusoidal variation in magnetic permeance of the airgap.

Figure 11:
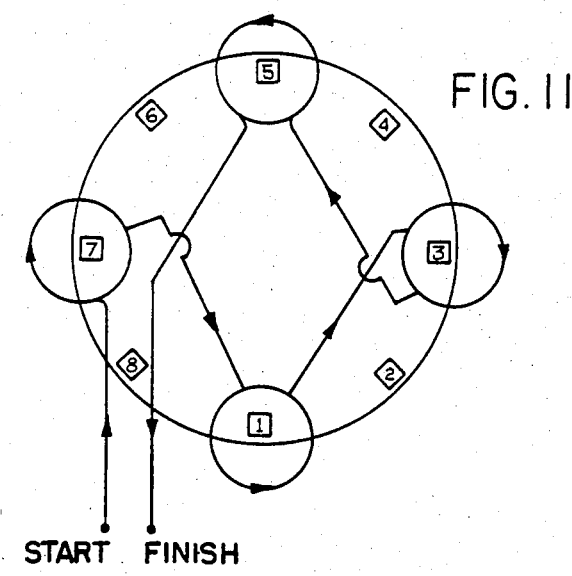
FIG. 11 is a schematic of the winding pattern of the first output of a single-phase input, two-phase output resolver stator.

Note that the shape of the rotor in FIG. 9 is similar in shape to the three-lobed rotors shown in FIGS. 7 and 11 of the Ringland Patent. The Ringland Patent explicitly claims that a sinusoidal variation of the radial length of the airgap would vary the magnetic permeance of the airgap sinusoidally. This is incorrect because the airgap permeance is proportional to the reciprocal of the airgap, and not to the airgap. Therefore, a sinusoidal variation of the airgap permeance cannot result from Formula (3) but will result if the reciprocal of the airgap is made to vary sinusoidally in accordance with Formula (1), as described above with reference to the present invention. Any design made in accordance with the Ringland Patent therefore will function with a pronounced harmonic content in the output waveform. This is recognized in the Ringland Patent itself, wherein it is stated "It will be appreciated that a pure sinusoid is the optimum but is difficult to accomplish, and the phrase "substantially sinusoidal" is used hereinafter in the specification and the claims to also cover approximately sinusoidal waves which deviate from the pure sinusoidal form but do not result in serious deficiencies in performance of the system." (Column 3, lines 30–35).

In an obvious attempt to improve the waveform, the crests of the rotor lobes as shown in FIG. 7 and 11 of the the Ringland Patent have been somewhat flattened in comparison to their shape as defined mathematically by Formula (3) and mapped in FIG. 9.

Figure 10:
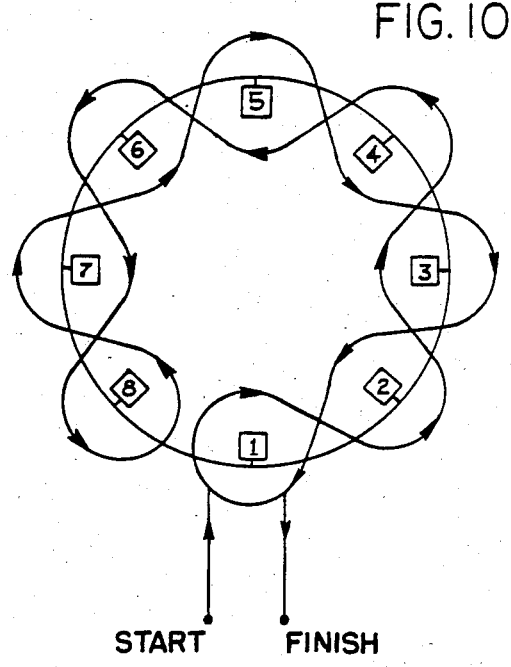
FIG. 10 is a schematic of the winding pattern of the input of a single-phase input, two-phase output resolver stator.
Figure 12:
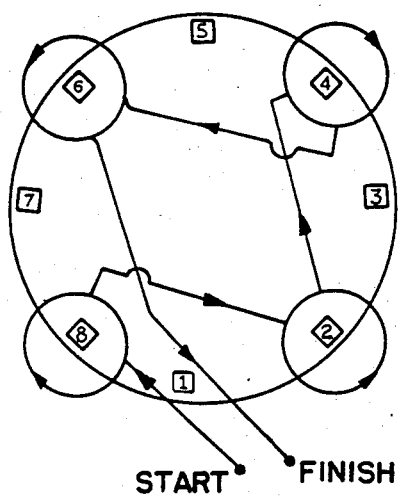
FIG. 12 is a schematic of the winding pattern of the second output of a single-phase input, two-phase output resolver stator.

FIGS. 10, 11 and 12, show the correct winding pattern according to the formulas set forth above, for a two-lobe resolver stator. The input winding is shown in FIG. 10 and comprises $T_1$ turns of wire on each of eight teeth. FIG. 11 shows the winding pattern for a first output phase, with teeth numbers 1, 3, 5 and 7 being wound with $T_2$ turns of wire. Finally, FIG. 12 shows the winding pattern for the second output phase with teeth 2, 4, 6 and 8 being also wound with $T_2$ turns of wire. The values of $T_1$ and $T_2$ are calculated from the specified values of the input variables using the analytical theory specially developed for this invention as referred to earlier.

A reluctance-type resolver for an electric machine is described above. Various details of the invention may be changed without departing from its scope. Furthermore, the foregoing description of the preferred embodiments of a resolver according to the present invention is provided for the purpose of illustration only and not for the purpose of limitation, the invention being defined by the claims.

We claim:

1. A reluctance-type resolver for an electric machine comprising a toothed stator having input and output windings thereon and a rotor rotatably positioned within said stator, wherein said rotor defines a periphery profiled to produce during rotation a smoothly varying airgap according to a formula wherein the inverse of the radial airgap at any predetermined point on the rotor is proportional to a constant plus the sine of the product of the number of lobes on said rotor and the angle between the predetermined point on the rotor and a reference point on the stator, whereby the magnetic permeance of the airgap varies sinusoidally.

2. A reluctance-type resolver according to claim 1, wherein the relationship between the stator and the rotor is stated by the formula P=4N/J, where P is the number of teeth on said stator, N is the number of lobes on said rotor, and J is a convenient odd integer.

3. A reluctance-type resolver according to claim 2, wherein said stator includes a single-phase input winding and a pair of 2-phase output windings.

4. A reluctance-type resolver according to claim 2, wherein the input winding has P coils with all coils having effectively the same number of turns.

5. A reluctance-type resolver according to claim 2, 3 or 4 wherein the turns of successive coils on the input winding are wound alternately clockwise and counterclockwise.

6. A reluctance-type resolver according to claim 5, wherein each of said output windings has P/2 coils, with each coil having the same number of turns.

7. A reluctance-type resolver according to claim 6, wherein the turns of successive coils of each of said output windings are wound alternately clockwise and counterclockwise around alternate teeth, with each tooth having exactly two coils, of which one coil belongs to an output winding and the other coil belongs to the input winding.

8. A reluctance-type resolver according to claim 1 and including a single-phase input winding and a $M_2$-phase output having $M_2$ output windings where $M_2$ is any integer, including unity, wherein the relationship between the stator and the rotor is stated by the formula $P=2M_2N/J$, where P is the number of teeth on said stator, N is the number of lobes on said rotor, and J is a convenient odd integer.

9. A reluctance-type resolver according to claim 8, wherein $M_2$ output windings have a balanced number of turns per phase with each phase having $P/M_2$ coils and all coils having the same number of turns, where P is the number of teeth on said stator.

10. A reluctance-type resolver according to claim 9, wherein the turns of the successive coils of the first phase output winding are wound in the same direction and in the opposite direction as the coils of the input winding, alternately around stator teeth separated by a pitch of $M_2$ teeth starting with any tooth designated as a tooth No. 1, according to the arrangement: tooth No. 1 (same direction); tooth No. $1+M_2$ (opposite direction); tooth No. $1+2M_2$ (same direction); tooth No. $1+3M_2$ (opposite direction) ...; ...; the coils of a second phase output winding being displaced relative to the coils of the first phase output winding by one tooth but otherwise wound identically starting with tooth No. 2; the coils of a third phase output winding being displaced relative to the coils of a second phase output winding by 1 tooth but otherwise wound identically starting with tooth No. 3; and continuing thus until the coils of a $M_2$-th output winding have been wound, with each tooth in the stator having exactly two coils, of which only one coil belongs to an output winding.

11. A reluctance-type resolver according to claim 1 and including a $M_1$-phase input where $M_1$ is any integer including unity, and a $M_2$-phase output where $M_2$ is any integer including unity, wherein the relationship between the stator and the rotor is stated by the formula $P=2M_1M_2N/J$, where P is the number of teeth on said stator, N is the number of lobes on said rotor, and J is a convenient odd integer.

12. A rotor reluctance-type resolver according to claim 11, wherein said stator includes $M_1$ input windings and $M_2$ output windings.

13. A reluctance-type resolver according to clim 11 or 12, wherein each of the $M_1$ input windings has $P/M_1$ coils with all coils having effectively the same number of turns, and each of the $M_2$ output windings has $P/M_2$ coils with all coils having effectively the same number of turns which may or may not differ from the number of turns in an input coil.

14. A reluctance-type resolver according to claim 13, wherein the turns of the successive coils of the first phase input winding are wound alternately clockwise and counterclockwise around stator teeth separated by a pitch of $M_1$ teeth starting with any tooth designated as a tooth No. 1, according to the arrangement: tooth No. 1 (clockwise); tooth No. $1+M_1$ (counterclockwise); tooth No. $1+2M_1$ (clockwise); tooth No. $1+3M_1$ (counterclockwise); ...; the coils of the second phase input winding being displaced relative to the coils of the first phase input window by 1 tooth but otherwise wound in an identical manner starting with tooth No. 2; the coils of the third phase input winding being displaced relative to the coils of the second phase input winding by 1 tooth but otherwise wound in an identical manner starting with tooth No. 3; and so on until the coils of the $M_1$-th phase input winding have been wound, with no stator tooth having either more or less than one coil belonging to an input winding.

15. A reluctance-type resolver according to claim 13, wherein the turns of $P/M_2$ number of successive coils of each of the $M_2$ output windings are wound in the same direction and in the opposite direction as the coils of the input winding, alternately around stator teeth separated by a pitch of $M_2$ teeth starting with the first phase output winding and any tooth designated as a tooth No. 1, according to the arrangement: tooth No. 1 (same direction); tooth No. $1+M_2$ (opposite direction); tooth No. $1+2M_2$ (same direction); tooth No. $1+3M_2$ (opposite direction) ...; ... the coils of a second phase output winding being displayed relative to the coils of the first phase output winding by one tooth but otherwise wound identically starting with tooth No. 2; the coils of a third phase output winding being displaced relative to the coils of a second phase output winding by 1 tooth but otherwise wound identically starting with tooth No. 2; and continuing thus until the coils of a $M_2$-th phase output winding have been wound, with each tooth in the stator having exactly two coils, of which only one coil belongs to an output winding.

* * * * *